United States Patent
Ichiyoshi

[11] Patent Number: 6,014,366
[45] Date of Patent: Jan. 11, 2000

[54] VARIABLE-BANDWIDTH FREQUENCY DIVISION MULTIPLEX COMMUNICATION SYSTEM

[75] Inventor: Osamu Ichiyoshi, Tokyo, Japan

[73] Assignee: NEC Corporation, Tokyo, Japan

[21] Appl. No.: 08/839,753

[22] Filed: Apr. 15, 1997

[30] Foreign Application Priority Data

Apr. 15, 1996 [JP] Japan ................... 8-092834

[51] Int. Cl.[7] ................ H04J 1/04; H04J 1/18
[52] U.S. Cl. .............. 370/210; 370/484; 370/497; 375/261
[58] Field of Search ................ 370/206, 210, 370/480, 481, 484, 488, 497; 375/260, 261, 295, 298, 316, 324, 328, 350; 708/300, 400, 403, 404, 405

[56] References Cited

U.S. PATENT DOCUMENTS

| | | | |
|---|---|---|---|
| 3,706,929 | 12/1972 | Robinson et al. | 375/216 |
| 4,103,110 | 7/1978 | Picquendar et al. | 370/210 |
| 5,058,107 | 10/1991 | Stone et al. | 370/481 |
| 5,251,218 | 10/1993 | Stone et al. | 370/484 |
| 5,657,313 | 8/1997 | Takahashi et al. | 370/491 |
| 5,732,068 | 3/1998 | Takahashi et al. | 370/206 |
| 5,822,323 | 10/1998 | Kaneko et al. | 370/480 |

FOREIGN PATENT DOCUMENTS 63-200635 8/1988 Japan.
63-200636 8/1988 Japan.

*Primary Examiner*—Alpus H. Hsu
*Attorney, Agent, or Firm*—Sughrue, Mion, Zinn, Macpeak & Seas, PLLC

[57] ABSTRACT

A variable-bandwidth frequency-division multiplex communication system which needs no interpolation circuits, but uses switch element of simple structure. The system includes a signal combining circuit which has N A/D converters associated respectively with independent information signals to be transmitted, a complex local oscillator for generating complex signals each having a frequency $k\Delta f$ ($1 \leq k \leq N-1$), $\Delta f$ being the channel frequency interval, N complex multipliers for multiplying the outputs of the A/D converters by the respective complex signals, and producing N output signals, a circuit for effecting an inverse Fourier transform of N points, an $N \times N$ switch circuit connected between the outputs of the complex multipliers and input terminals of the inverse Fourier transform circuit, N digital subfilters connected respectively to the outputs of the inverse Fourier transform circuit, N delay units connected respectively to outputs of the digital subfilters, and an adder for adding output signals from the delay units and outputting a sum signal.

14 Claims, 11 Drawing Sheets

VARIABLE-BANDWIDTH FREQUENCY DIVISION MULTIPLEX COMMUNICATION SYSTEM

BACKGROUND OF THE INVENTION

1. Field of the Invention

The present invention relates to a frequency-division multiplex (FDM) technology widely used in the art of communications and measurements, and more particularly to a variable-bandwidth frequency-division multiplex communication system capable of dividing and multiplexing frequency channels with the frequency band of each frequency channel being variable.

2. Description of the Prior Art

Transmultiplexers (TMUX) are equipment for efficiently branching and combining a number of frequency-division multiplex signals according to batch digital signal processing. The transmultiplexers are widely used in the field of communications for mutual transformation between frequency-division multiplex signals and time-division multiplex (TDM) signals. The fundamental concept of transmultiplexers is proposed in Maurice G. Bellanger and Jacques L. Daguet, "TDM-FDM Transmultiplexer: Digital Polyphase and FFT", IEEE Trans., COM-22, No. 9, September 1974.

Conventional transmultiplexers suffer a problem in that if the frequency interval between FDM channels is expressed by $\Delta f$, then the maximum bandwidth of each FDM channel is limited to $\Delta f$. Multimedia communications which are currently drawing much attention require flexible communication paths which are capable of communications in a variety of bandwidths. The conventional transmultiplexers are not suitable for multimedia communications because of the fixed frequency band for each channel. Consequently, research efforts have been directed to transmultiplexers which are able to perform communications in variable bandwidths.

For example, Japanese laid-open patent publication No. 63-200635 (JP, A, 63-200635) discloses a transmultiplexer of the multiple sampling type. The multiple-sampling-type transmultiplexer uses an interpolating digital subfilter, and generates a channel clock and an interpolation clock whose frequency is m times the frequency of the channel clock. The interpolating digital subfilter carries out a predetermined filtering process based on the timing provided by the channel clock and the interpolation clock, and generates a filter output at the sampling rate of the interpolation clock. The filter output is supplied to a Fourier transform circuit.

FIG. 1 of the accompanying drawings shows the transmultiplexer disclosed in the above JP, A, 63-200635 document. In the transmultiplexer, it is assumed that an intermediate-frequency (IF) signal is supplied as an input thereto, a channel interval is represented by $\Delta f$, and the multiplex level by N. The transmultiplexer comprises a local oscillator 101 for generating a local oscillation signal to convert an intermediate-frequency signal to a baseband signal, a multiplex clock generator 109 for generating a multiplex clock having a frequency of $N\Delta f$, a divide-by-N/m frequency divider 115 for frequency-dividing the multiplex clock by N/m, and a divide-by-m frequency divider 116 for frequency-dividing an interpolation clock by m. A mixer 103 is supplied with the intermediate-frequency signal and the local oscillation signal, and another mixer 104 is supplied with the intermediate-frequency signal and the local oscillation signal which has been delayed in phase by $\pi/2$ by a $\pi/2$ phase shifter 102. The mixers 103, 104 have respective output terminals connected respectively through low-pass filters (LPFs) 105, 106 to respective analog-to-digital (A/D) converters 107, 108.

The transmultiplexer also includes a switching circuit 111 for carrying out signal branching and sampling. Specifically, the switching circuit 111 is supplied with output signals from the A/D converters 107, 108 and separates the inputted time sequence of signals into N separate output signals in every N samples. The N output signals from the switching circuit 111 are supplied through respective delay units 112-1~112-N to respective interpolating digital subfilters 117-1~117-N. The delay units 112-1~112-N serve to delay the supplied signals by time lags proportional to the order in which the signals come in, for thereby generating timed baseband signals. The transmultiplexer further has a fast Fourier transform (FFT) circuit 114 for effecting a complex fast Fourier transform of N points on respective output signals from the interpolating digital subfilters 117-1~117-N. The FFT circuit 114 produces N complex output signals as respective channel output signals of the transmultiplexer.

FIG. 2A shows an arrangement of an interpolating digital subfilter 117-i where $(N/2)+1 \leq i \leq N$, and FIG. 2B of the accompanying drawings shows an arrangement of an interpolating digital subfilter 117-i where $1 \leq i \leq N/2$. According to the arrangement shown in FIG. 2A, the interpolating digital subfilter comprises two digital subfilters 121, 122 connected to an input terminal, a delay circuit 124 for delaying an output signal from the digital subfilter 122, and an adder 126 for adding output signals from the digital subfilter 121 and the delay circuit 124. According to the arrangement shown in FIG. 2B, the interpolating digital subfilter comprises two digital subfilters 121, 123 connected to an input terminal, a delay circuit 125 for delaying an output signal from the digital subfilter 123, and an adder 126 for adding output signals from the digital subfilter 121 and the delay circuit 125.

Another document JP, A, 63-200636 reveals a variable-bandwidth FDM signal branching circuit which employs the above multiple-sampling-type transmultiplexer. FIG. 3 illustrates the revealed variable-bandwidth FDM signal branching circuit. As shown in FIG. 3, the variable-bandwidth FDM signal branching circuit has a switch matrix 222 connected to output terminals of a multiple-sampling transmultiplexer (TMUX) 221 having a structure shown in FIG. 1, and k signal interpolation circuits 223-1~223-k connected to output terminals of the switch matrix 222. It is assumed that the variable-bandwidth FDM signal branching circuit outputs (k-5) signals each having a bandwidth of $\Delta f$, a signal having a bandwidth of $2\Delta f$, and a signal having a bandwidth of $3\Delta f$. The (k-5) signals each having a bandwidth of $\Delta f$ are outputted respectively from the signal interpolation circuits 223-6~223-k. The signal having a bandwidth of $2\Delta f$ is produced when output signals from the signal interpolation circuits 223-1, 223-2 are transferred through respective frequency shifters 224-1, 224-2 and added to each other by an adder 225-1, and a sum signal from the adder 225-1 is passed through an analog low-pass filter 226-1. The signal having a bandwidth of $3\Delta f$ is produced when output signals from the signal interpolation circuits 223-3~223-5 are transferred through respective frequency shifters 224-3~224-5 and added to each other by an adder 225-2, and a sum signal from the adder 225-2 is passed through an analog low-pass filter 226-2.

Since the sampling frequency is $2\Delta f$ and the bandwidth of a signal for each channel is restricted to $\Delta f$, the conventional multiple-sampling-type transmultiplexer needs a wide bandwidth for multiplexing channels, and hence requires a signal conversion to a signal sequence with an increased sampling frequency, i.e., an interpolation process. Accordingly, the conventional multiple-sampling-type transmultiplexer necessarily becomes large in circuit scale because of the need for interpolation circuits. A channel multiplexer which employs the above conventional multiple-sampling-type transmultiplexer is also large in circuit scale as it has signal interpolation circuits and frequency shifters. If only some of the channels are associated with frequency shifters so as to reduce the circuit scale, then the channel multiplexer requires N×N full matrix switch elements in order to increase the bandwidth of a channel in any arbitrary frequency position. As a result, the channel multiplexer still remains large in circuit scale.

SUMMARY OF THE INVENTION

It is an object of the present invention to provide a variable-bandwidth frequency-division multiplex communication system which needs no interpolation circuits, but uses switch elements of simple structure for achieving fully bandwidth-variable communications.

According to the present invention, the above object can be accomplished by a variable-bandwidth frequency-division multiplex communication system having a transmission device including a signal combining circuit and a reception device including a signal branching circuit, for establishing channels having a frequency band wider than a channel frequency interval $\Delta f$.

The signal combining circuit has a sampling timing generator for generating a sampling frequency $f_s$ which is a multiple by a natural number of the channel frequency interval $\Delta f$, a plurality of A/D converters associated respectively with N independent information signals to be transmitted, N being a natural number, for sampling the corresponding information signals at the sampling frequency $f_s$ and converting the information signals to digital signals, a complex local oscillator for generating complex signals each having a frequency which is k times the channel frequency interval $\Delta f$, k being an integer ranging from 0 to N−1, N complex multipliers for multiplying the digital signals from the A/D converters by the respective complex signals from the complex local oscillator, and producing N output signals, an inverse Fourier-transform circuit for effecting a complex inverse Fourier transform of N points, an N-input/N-output switch circuit connected between output terminals of the complex multipliers and input terminals of the inverse Fourier transform circuit, a plurality of digital subfilters connected respectively to N output terminals of the inverse Fourier transform circuit, for filtering output signals from the inverse Fourier transform circuit, a plurality of delay units connected respectively to output terminals of the digital subfilters, and an adder for adding output signals from the delay units and outputting a sum signal. In the signal branching circuit, a k-th delay unit ($1 \leq k \leq N$) applies a time lag expressed by $(k-1)/f_s$ to an output signal from a corresponding one of the digital subfilters.

The signal branching circuit has a sampling timing generator for generating a sampling frequency $f_s$ which is a multiple by a natural number of the channel frequency interval $\Delta f$, an N-output shift register for shifting a complex digital numerical sequence of a received digital signal in synchronism with the sampling frequency $f_s$, N being a natural number, a sampling circuit for sampling output signals from respective stages of the shift register in synchronism with the sampling frequency $f_s$, a plurality of digital subfilters for filtering respective N signals outputted in parallel from the sampling circuit, a Fourier transform circuit for effecting a complex Fourier transform of N points on respective output signals from the digital subfilters, an N-input/N-output switch circuit connected to output terminals of the Fourier transform circuit, a complex local oscillator for generating complex signals each having a frequency which is k times the channel frequency interval $\Delta f$, k being an integer ranging from 0 to N−1, N complex multipliers for multiplying output signals from the switch circuit by the respective complex signals from the complex local oscillator, and producing N output signals, and a plurality of D/A converters connected respectively to output terminals of the complex multipliers. In the signal branching circuit, a received signal which is converted to a baseband signal and converted to a digital signal is applied to the signal branching circuit, and the D/A converters produce frequency-divided multiplex output signals.

The objects of the present invention can also be achieved by a variable-bandwidth frequency-division multiplex communication system for achieving a multiplex access using a relay station having antennas corresponding to respective geographic regions, to provide a complete connection between the regions. The relay station has as many sets of a reception device and a transmission device as the number of the antennas, and a baseband switch matrix. Signal branching circuits, each identical to the above signal branching circuit, are connected between the reception devices and the baseband switch matrix, and signal combining circuits, each identical to the above signal combining circuit, are connected between the transmission devices and the baseband switch matrix. The sampling timing generator and the complex local oscillator may be shared by the signal branching circuits and the signal combining circuits.

According to the present invention, it is possible to construct a variable-bandwidth communication network having a flat frequency characteristic curve from a narrow-bandwidth communication network having a step frequency (channel frequency interval) of $\Delta f$, the variable-bandwidth communication network having a bandwidth which is an integral multiple of the bandwidth of the narrow-bandwidth communication network. Because a filter bank is realized by a digital signal processing technology, the variable-bandwidth frequency-division multiplex communication system provide highly accurate characteristics, but is small in size, lightweight, has a low power requirement, and is highly reliable in operation.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
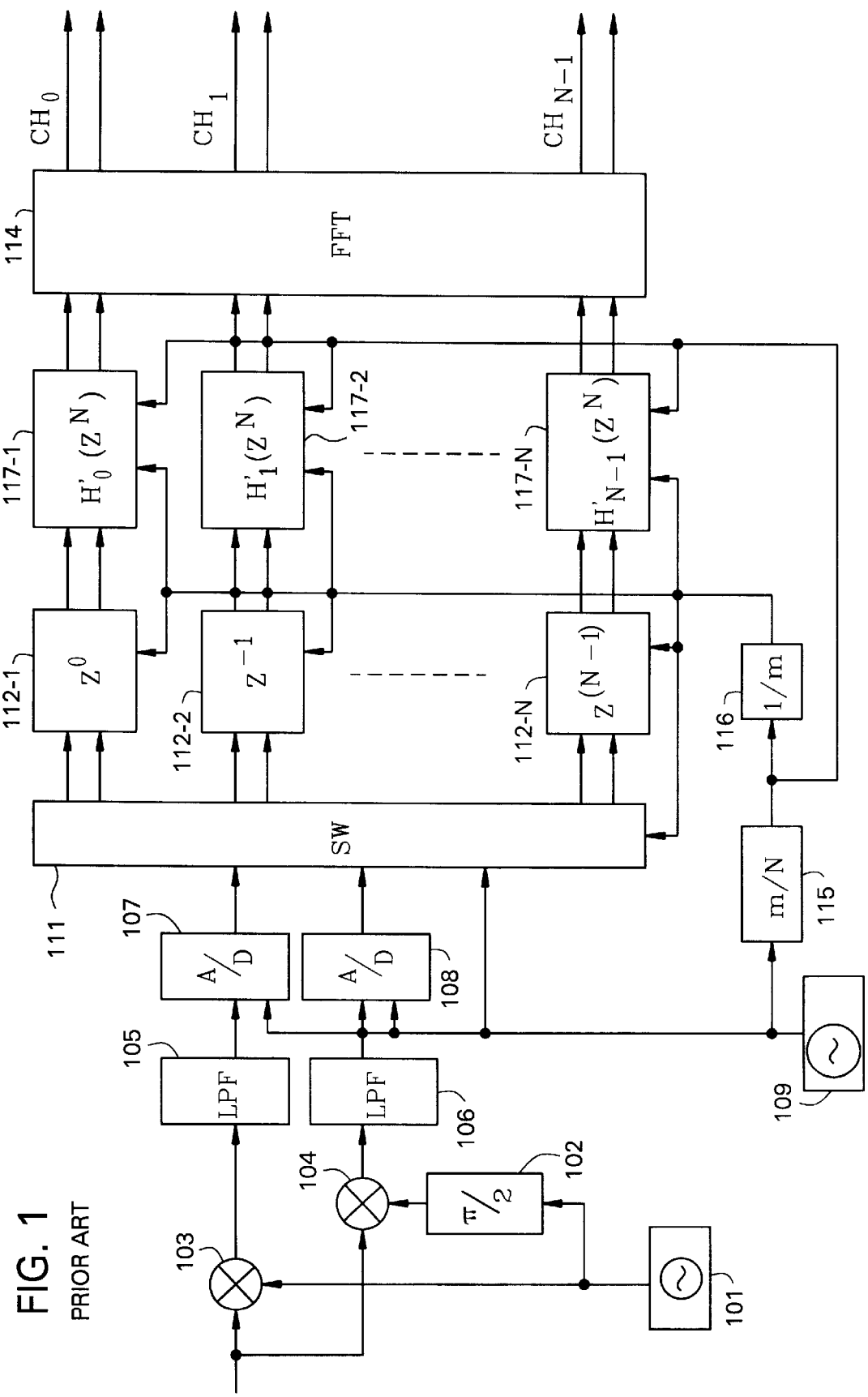
FIG. 1 is a block diagram of a conventional multiple-sampling-type transmultiplexer.
Figure 2A:
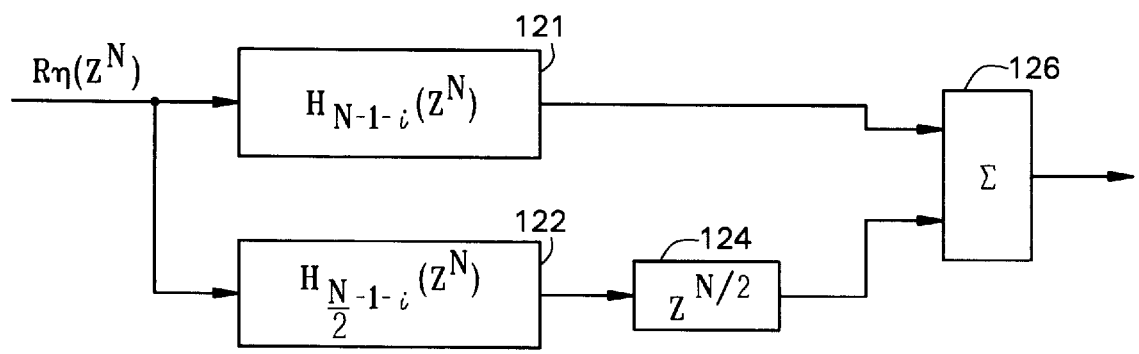
FIGS. 2A and 2B are block diagrams of interpolation digital subfilters for use in the conventional multiple-sampling-type transmultiplexer shown in FIG. 1.
Figure 2B:
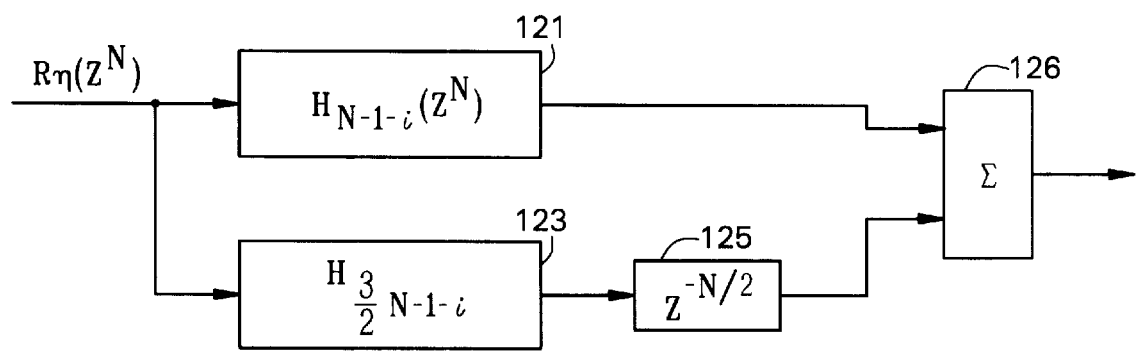
Figure 3:
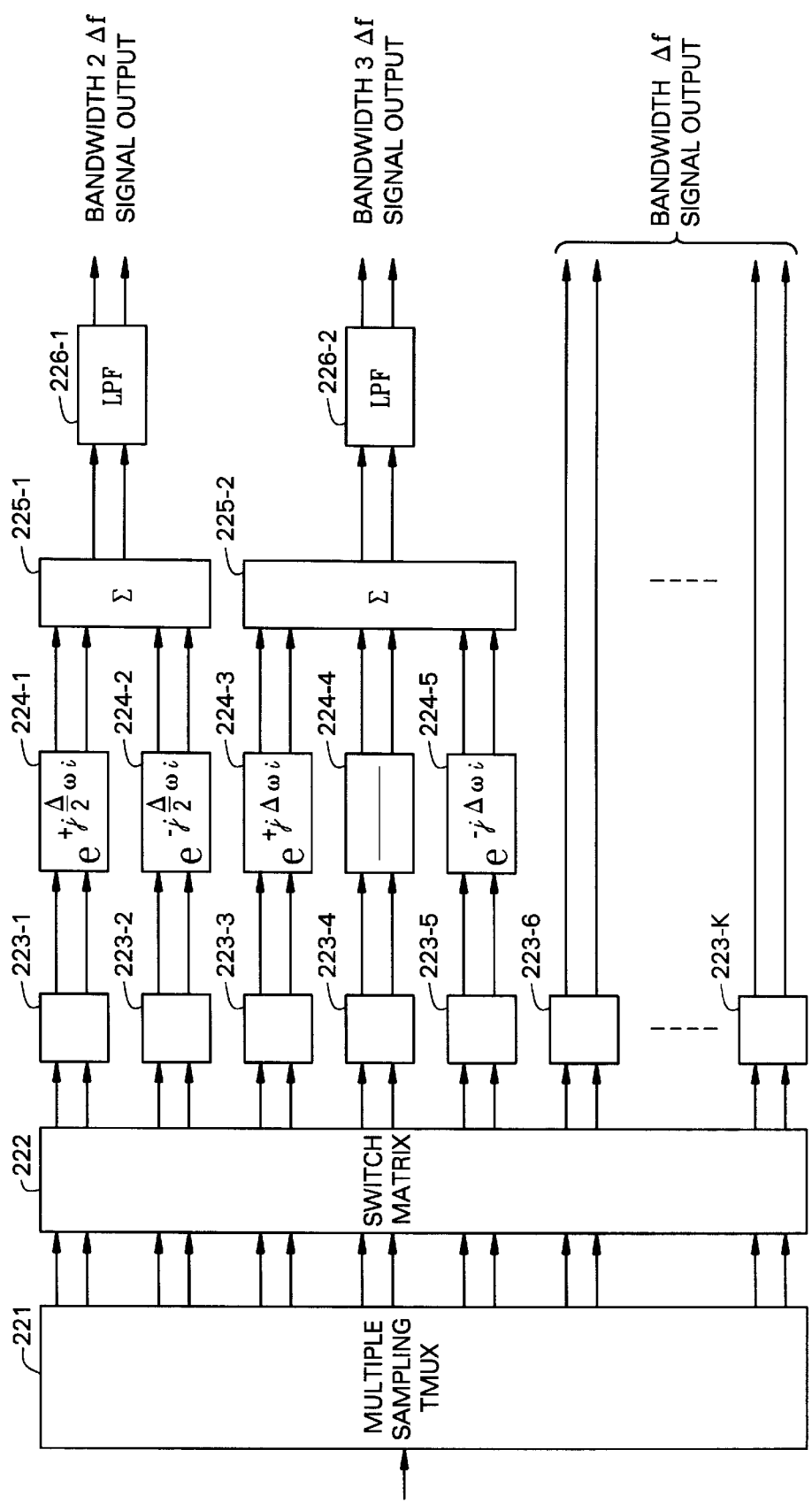
FIG. 3 is a block diagram of a conventional variable-bandwidth FDM signal branching circuit.
Figure 4:
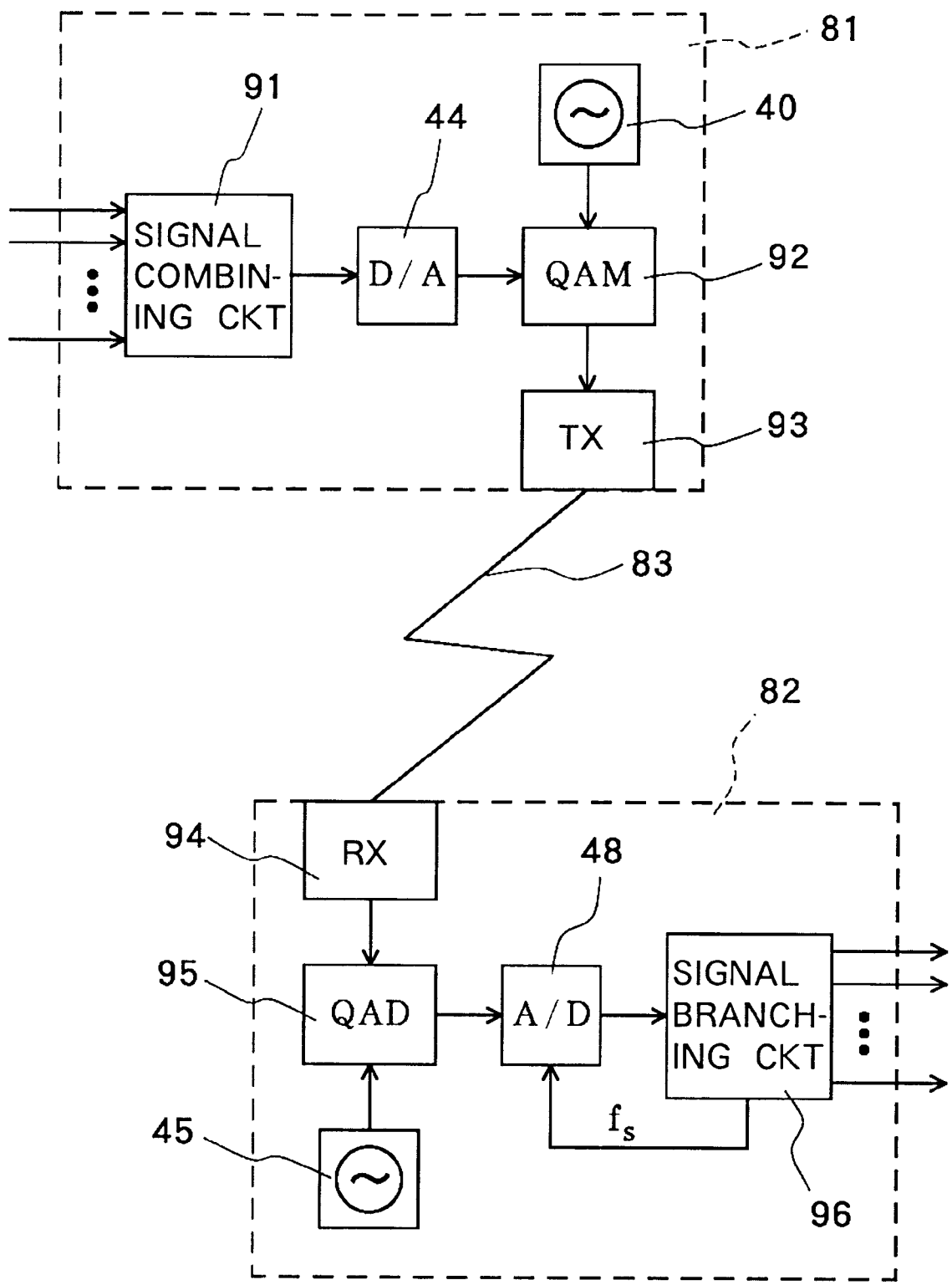
FIG. 4 is a block diagram of a variable-bandwidth frequency-division multiplex communication system according to a preferred embodiment of the present invention.

As shown in FIG. 4, a variable-bandwidth frequency-division multiplex communication system according to a preferred embodiment of the present invention generally comprises a transmission device 81 and a reception device 82 which are connected to each other by a circuit 83. The transmission device 81 comprises a variable-bandwidth transmission device, and the reception device 82 comprises a variable-bandwidth reception device.

The transmission device 81 comprises a signal combining circuit 91 for combining N independent information signals, N being a natural number, with a transmultiplexer according to the present invention, a high-speed digital-to-analog (D/A) converter 44 for converting a digital output signal from the signal combining circuit 91 to an analog signal, a local oscillator 40 for outputting a carrier, a quadrature amplitude modulation (QAM) circuit 92 for quadrature-amplitude-modulating the carrier from the local oscillator 40 with an output signal from the high-speed D/A converter 44, and a transmitter 93 for transmitting a modulated output signal from the QAM circuit 92 through the circuit 83 to the reception device 82.

The reception device 82 comprises a receiver 94 for receiving a signal transmitted through the circuit 83 from the transmission device 81 as a received intermediate-frequency (IF) signal, a local oscillator 45 for generating a local oscillation signal having substantially the same frequency as the carrier outputted from the local oscillator 40 in the transmission device 81, a quadrature amplitude demodulation (QAD) circuit 95 for quadrature-amplitude-demodulating the received IF signal with the local oscillation signal, an A/D converter 48 for sampling a demodulated output signal from the QAD circuit 95 with a sampling frequency $f_s$ and converting it to a digital signal, and a signal branching circuit 96 for supplying a signal of the sampling frequency $f_s$ to the A/D converter 48 and branching the digital signal outputted from the A/D converter 48 into N information signals with the transmultiplexer according to the present invention.

The sampling frequency $f_s$ is normally set to $f_s = N\Delta f$ where $\Delta f$ represents a channel frequency interval. The sampling frequency $f_s$ is generated independently in the transmission device 81 and the reception device 82.

The signal combining circuit 91 in the transmission device 81 will be described below with reference to FIG. 5.

Figure 5:
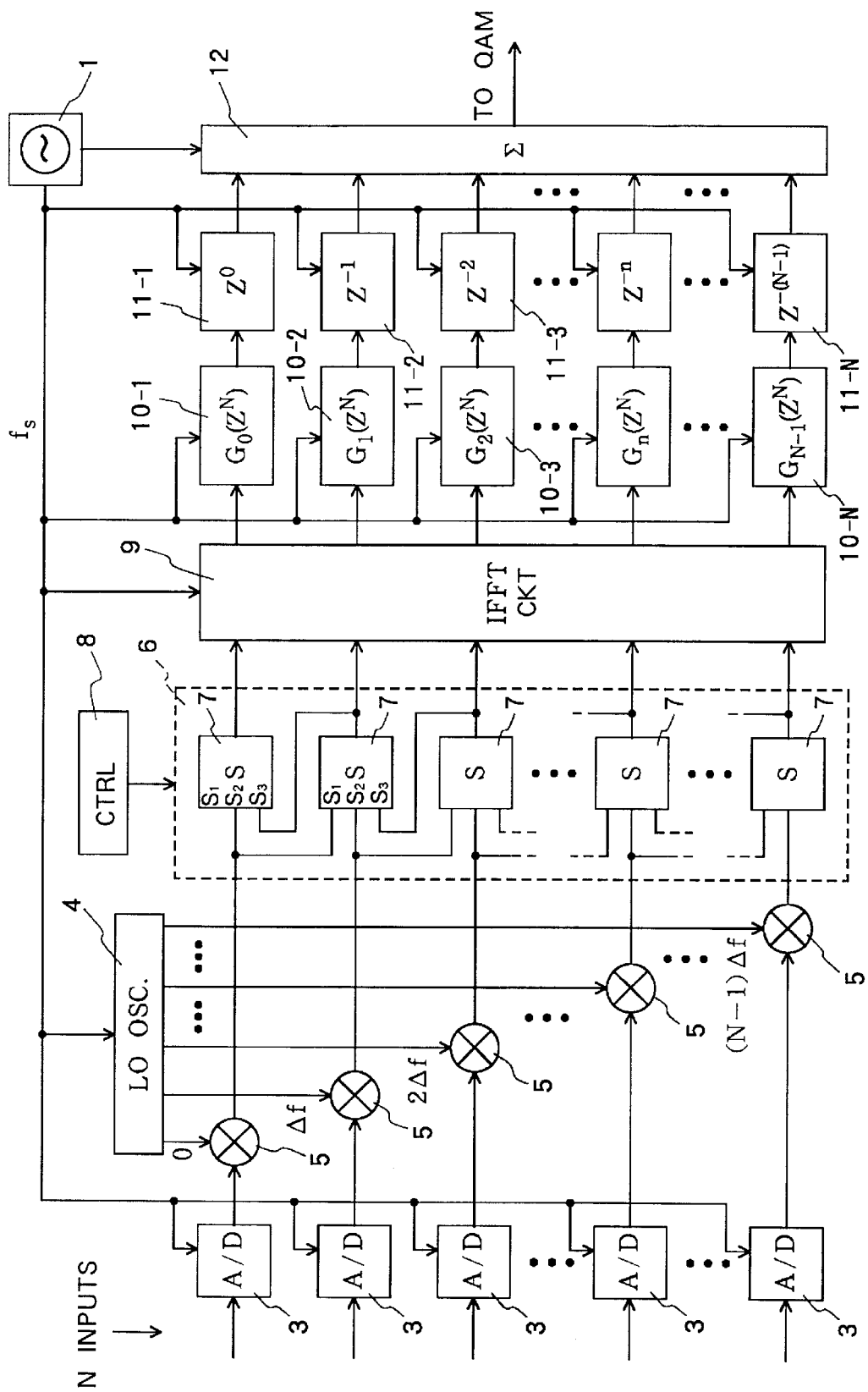
FIG. 5 is a block diagram of a transmultiplexer for use as a signal combining circuit in a transmission device in the variable-bandwidth frequency-division multiplex communication system shown in FIG. 4.

As shown in FIG. 5, the signal combining circuit 91 includes a sampling timing generator 1 for generating a signal of the sampling frequency $f_s$ and N A/D converters 3 for sampling N independent information signals with the sampling frequency $f_s$ and converting them to digital signals. The signal combining circuit 91 also has an N-output complex local oscillator 4 for generating N complex local signals as digital signals having respective frequencies $k\Delta f$ ($k = 0, 1, \ldots, N-1$) based on the sampling frequency $f_s$. The term "complex" contained in the complex local signal signifies the simultaneous generation of cosine and sine components. The term "N-output" contained in the N-output complex local oscillator 4 means the simultaneous outputting of N sets of signals. The A/D converters 3 have respective output terminals connected to respective complex multipliers 5. The complex multipliers 5 are supplied with the output digital signals from the respective A/D converters 3 and also with the complex local signals [frequencies = 0, $\Delta f$, $2\Delta f, \ldots, (N-1)\Delta f$] from the N-output complex local oscillator 4. For example, an i-th ($1 \leq i \leq N$) information signal to be transmitted is supplied to and converted by an i-th A/D converter 3 to a digital signal, which is multiplied by a complex local signal having a frequency of $(i-1)\Delta f$ in an i-th complex multiplier 5. Output signals from the complex multipliers 5 are supplied to a switch circuit (i.e., switch matrix 6) which is controlled by a controller 8. The switch matrix 6 comprises N 3-input/1-output switch elements 7 each having input terminals $S_1, S_2, S_3$. The output signal from an i-th ($1 \leq i \leq N$) complex multiplier 5 is supplied to the input terminal $S_2$ of an i-th switch element 7 and the input terminal $S_1$ of an (i+1)th switch element 7. The input terminal $S_3$ of an i-th switch element 7 is connected to the output terminal of an (i+1)th switch element 7. If i+1>N, however, then no such connection is made for an i-th switch element 7. The input terminals $S_1, S_2, S_3$ of the switch elements 7 are individually switched one from another by the controller 8.

The signal combining circuit 91 also has an inverse fast Fourier transform (IFFT) circuit 9 for effecting an inverse fast Fourier transform of N-points on output signals from the switch elements 7 which are supplied as input signals to the IFFT circuit 9. The IFFT circuit 9 is also supplied with the sampling frequency $f_s$. The IFFT circuit 9 produces N complex output signals which are supplied through respective digital subfilters 10-1~10-N to respective delay units 11-1~11-N. The digital filters 10-1~10-N and the delay units 11-1~11-N are supplied with the sampling frequency $f_s$. An i-th digital subfilter 10-i serves to effect a filtering process whose transfer characteristic is expressed by $G_{i-1}(Z^N)$. The N digital subfilters 10-1~10-N jointly make up a digital filter circuit. An i-th delay unit 11-i serves to give a time lag expressed by $(i-1)/\Delta f$. The N delay units 11-1~11-N jointly make up a delay circuit. Complex output signals from the delay units 11-1~11-N are added together by an adder 12, which supplies a sum signal as a complex sample sequence of data to the high-speed D/A converter 44 (see FIG. 4). The high-speed D/A converter 44 converts the supplied complex sample sequence to a complex continuous signal, which is applied to QAM circuit 92 (see FIG. 4).

The signal branching circuit 96 in the reception device 82 will be described below with reference to FIG. 6.

Figure 6:
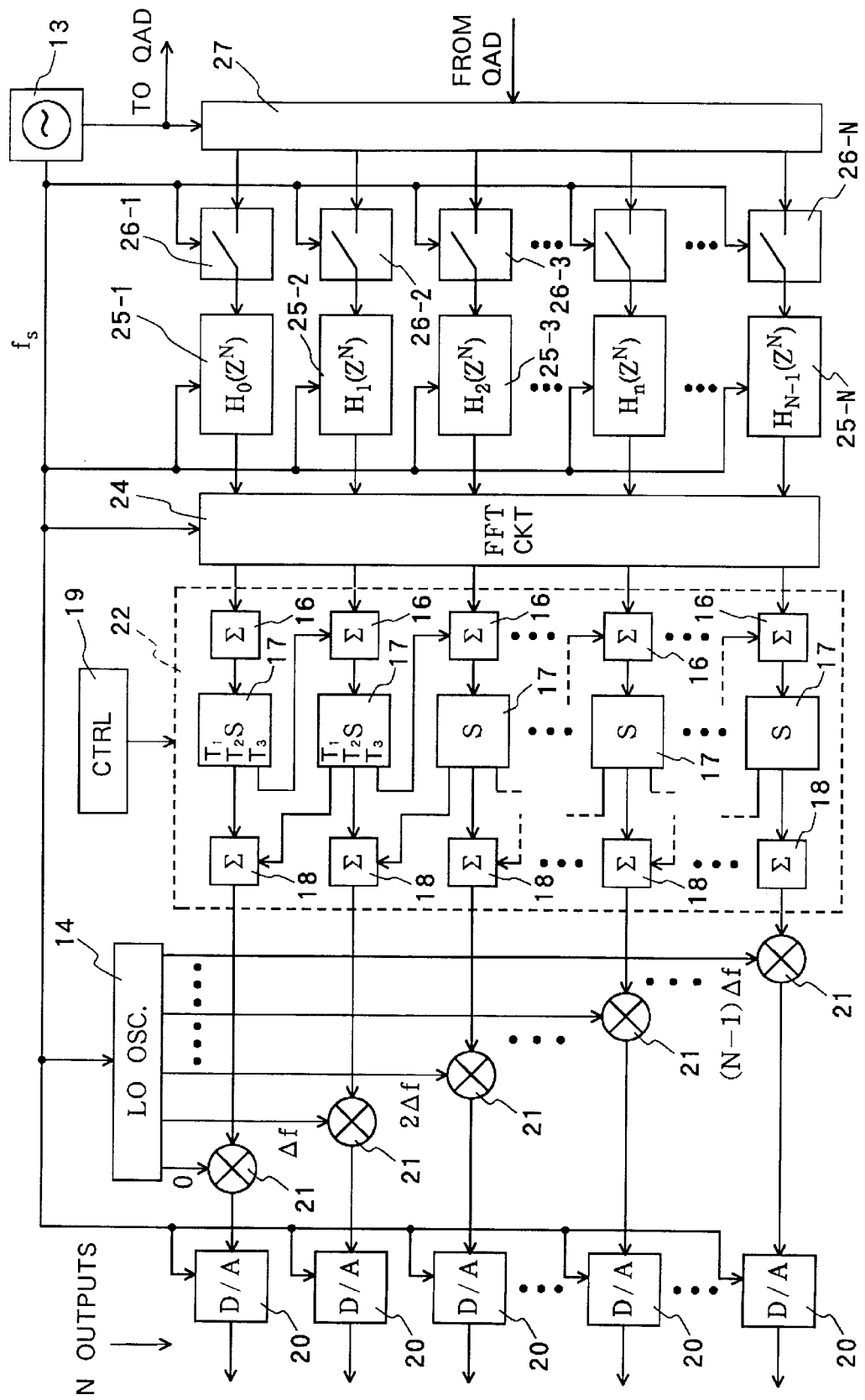
FIG. 6 is a block diagram of a transmultiplexer for use as a signal branching circuit in a reception device in the variable-bandwidth frequency-division multiplex communication system shown in FIG. 4.

As shown in FIG. 6, the signal branching circuit 96 includes a sampling timing generator 13 for generating a signal having substantially the same frequency as the sampling timing generator 1 in the signal combining circuit 91. Since the frequencies generated by the sampling timing generators 1, 13 are substantially the same as each other, the frequency generated by the sampling timing generator 13 in the signal branching circuit 96 is also referred to as a sampling frequency $f_s$. A complex output signal from the QAD circuit 95 (see FIG. 4) is sampled and converted by the A/D converter 48 (see FIG. 4) with the sampling frequency $f_s$ to a digital signal. The digital signal is supplied as a complex digital numerical sequence of data to a shift register 27. The shift register 27 comprises a 1-input/N-output shift register that is driven by the sampling frequency $f_s$. The shift register 27 produces complex output signals which are outputted from respective stages of the shift register 27 and supplied to respective sampling circuits 26-1~26-N. The sampling circuit 26-1 ~26-N sample the supplied complex output signals based on the sampling frequency $f_s$. Sampled signals from the sampling circuits 26-1~26-N are then supplied to respective digital subfilters 25-1~25-N. An i-th digital subfilter 15-i serves to perform a filtering process whose fundamental filter characteristic is expressed by $H_{i-1}(Z^N)$. The N digital subfilters 25-1~25-N jointly make up a digital filter circuit.

The signal branching circuit 96 also has a fast complex Fourier transform (FFT) circuit 24 for effecting a fast complex Fourier transform of N points on N parallel output signals (a complex numerical sequence of data) from the respective digital subfilters 25-1~25-N. The FFT circuit 24 has output terminals connected to a switch circuit 22 which is controlled by a controller 19. The switch circuit 22 comprises N first adders 16 coupled respectively to the output terminals of the FFT circuit 24, N 1-input/3-output switch elements 17 for being supplied with respective output signals from the adders 16, and N second adders 18 coupled respectively to output terminals of the switch elements 17. Each of the switch elements 17 has output terminals $T_1, T_2, T_3$. An i-th first adder 16 adds a complex output signal from an i-th output terminal of the FFT circuit 24 and an output signal from the output terminal $T_3$ of an (i–1)th switch element 17, and outputs a sum signal to an i-th switch element 17. An i-th second adder 18 adds an output signal from the output terminal $T_2$ of an i-th switch element 17 and an output signal from the output terminal $T_1$ of an (i+1)th switch element 17, and outputs a sum signal. If i+1>N or i–1<0, then no such connection is made for an i-th first adder 16, an i-th switch element 17, and i-th second adder 18. The output terminals $T_1, T_2, T_3$ of the switch elements 17 are individually switched one from another by the controller 19.

The signal branching circuit 96 also has an N-output complex local oscillator 14 for generating N complex local signals having respective frequencies kΔf (k=0, 1, . . . , N–1) based on the sampling frequency $f_s$. The second adders 18 have respective output terminals connected to respective complex multipliers 21. The complex multipliers 21 are supplied with the output signals from the respective second adders 18 and also with the complex local signals [frequencies=0, Δf, 2Δf, . . . , (N–1)Δf] from the N-output complex local oscillator 14. The complex multipliers 21 have respective output terminals connected respectively to N D/A converters 20 which convert output signals from the complex multipliers 21 to analog signals based on the sampling frequency $f_s$. For example, a complex output signal from an i-th second adder 18 is multiplied by a complex local signal having a frequency of (i–1)Δf in an i-th complex multiplier 21, which supplies an output signal to an i-th D/A converter 20 that converts the supplied signal to an analog signal as an output signal (i.e., information signal).

Figure 7:
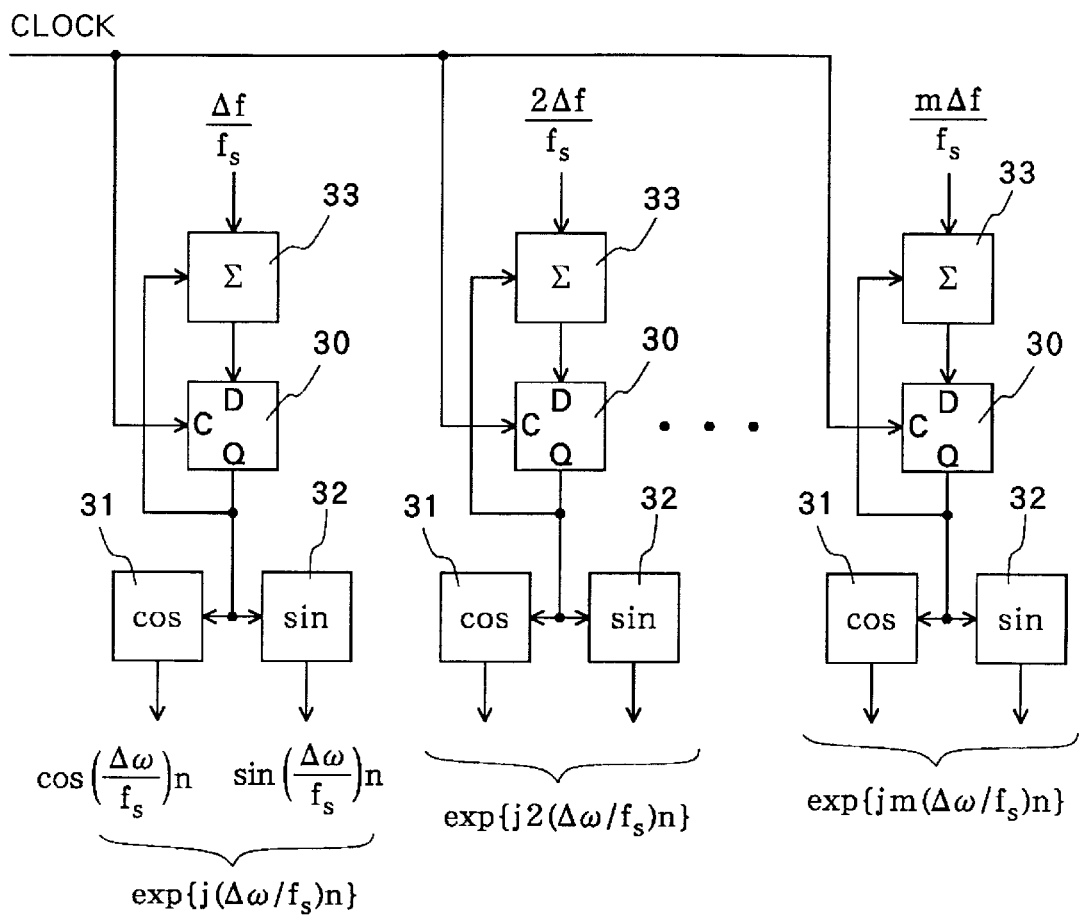
FIG. 7 is a block diagram of a complex local oscillator in each of the signal combining circuit shown in FIG. 5 and the signal branching circuit shown in FIG. 6.

Each of the complex local oscillators 4, 14 is shown in detail in FIG. 7. Each of the complex local oscillators 4, 14 comprises a plurality of blocks for generating respective complex local signals having respective frequencies to be outputted by each of the complex local oscillators 4, 14. Each of the blocks is constructed as a direct digital synthesizer (DDD), and has a D flip-flop 30, a table circuit 31 for generating a cosine component waveform, another table circuit 32 for generating a sine component waveform, and an adder 33. The D flip-flop 30 has a clock (C) terminal supplied with a common clock having the sampling frequency $f_s$, for example. If a complex local frequency of kΔf is to be generated by a certain block, then the adder 33 in that block is supplied with a numerical value corresponding to $kΔf/f_s$ and an output signal from a terminal Q of the D flip-flop 30 in the same block, and outputs a sum signal to a terminal D of the D flip-flop 30. The terminal Q of the D flip-flop 30 is connected to respective input terminals of the table circuits 31, 32. The table circuits 31, 32 are in the form of lookup tables, respectively, and comprise respective read-only memories (ROMs), for example. The above blocks of each of the complex local oscillators 4, 14 generate digital signals representative of instantaneous waveform values of complex local signals in response to the common clock which is supplied. In this manner, each of the complex local oscillators 4, 14 generate complex local signals having respective frequencies of 0, Δf, 2Δf, . . . , (N–1)Δf. Since complex frequencies are considered here, a frequency (N–1) Δf is equivalent to a frequency –Δf.

Figure 8A:
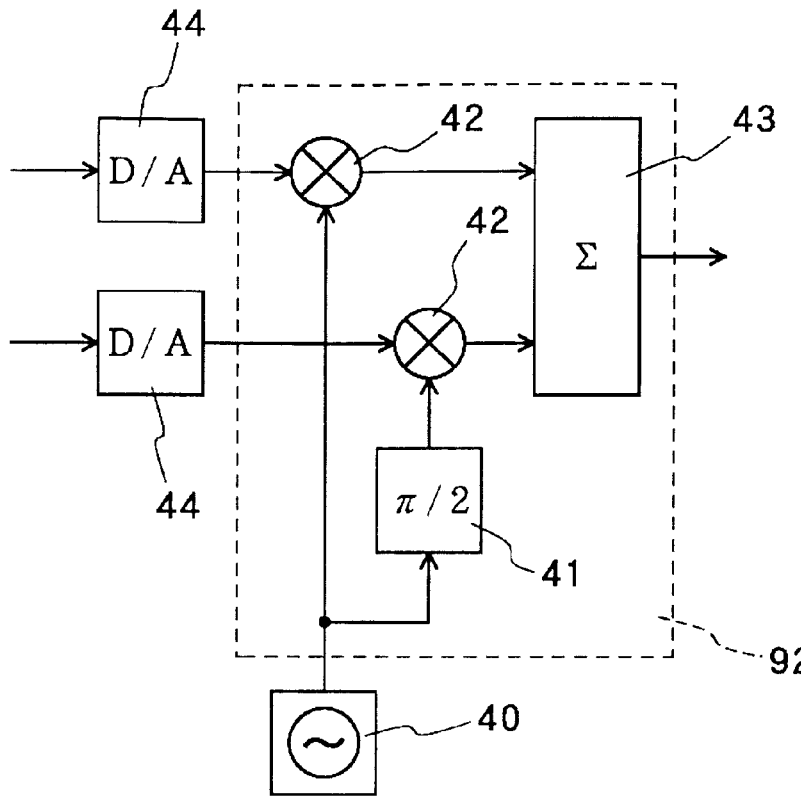
FIGS. 8A and 8B are block diagrams of a quadrature amplitude modulation (QAM) circuit and a quadrature amplitude demodulation (QAD) circuit, respectively, in the variable-bandwidth frequency-division multiplex communication system shown in FIG. 4.

The QAM circuit 92 and the QAD circuit 95 will be described with reference to FIGS. 8A and 8B. FIG. 8A shows the QAM circuit 92 in detail, and FIG. 8B shows the QAD circuit 95 in detail.

In the illustrated embodiment, the signal combining circuit 91 outputs a complex digital signal, and a complex digital signal is inputted to the signal branching circuit 96. As shown in FIG. 8A, a complex digital signal outputted from the signal combining circuit 91 is converted by two high-speed D/A converters 44 to two analog signals corresponding respectively to real and imaginary components, which are supplied to the QAM circuit 92. The two high-speed D/A converters 44 are shown in FIG. 8A because they convert the real and imaginary components, respectively, of the supplied complex digital signal.

The QAM circuit 92 comprises a π/2 phase shifter 41 for shifting the phase of the local oscillation signal (i.e., carrier) from the local oscillator 40 by π/2 (90 degrees), and outputting the phase-shifted local oscillation signal, two mixers 42 for being supplied with the two analog signals from the respective D/A converters 44, and a combiner 43 for combining output signals from the respective mixers 42. One of the mixers 42 is supplied with the local oscillation signal directly from the local oscillator 40, and the other mixers 42 is supplied with the phase-shifted local oscillation signal from the π/2 phase shifter 41.

Figure 8B:
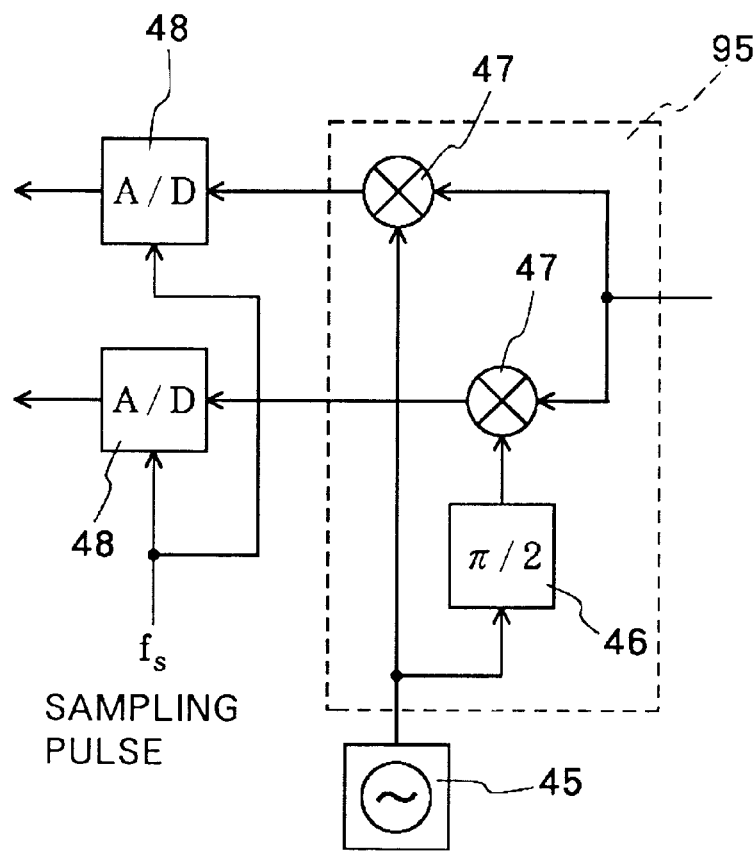

As shown in FIG. 8B, the QAD circuit 95 comprises a π/2 phase shifter 46 for shifting the phase of the local oscillation signal from the local oscillator 45 by π/2, and outputting the phase-shifted local oscillation signal, and two mixers 47 for being supplied with the received IF signal from the receiver 94 (see FIG. 4). One of the mixers 47 is supplied with the local oscillation signal directly from the local oscillator 45, and the other mixers 47 is supplied with the phase-shifted local oscillation signal from the π/2 phase shifter 46. Output signals from the respective mixers 47 are sampled and converted by two A/D converters 48 to digital signals, which are supplied as a complex digital signal to the signal branching circuit 96. The two A/D converters 48 are shown in FIG. 8B because they correspond to real and imaginary components, respectively, and output real and imaginary number components of the complex digital signal, respectively.

Operation of the variable-bandwidth frequency-division multiplex communication system of the present embodiment will be described below. First, a signal processing procedure in the transmission device 81 will first be described below.

In the signal combining circuit 91, the sampling timing generator 1 generates sampling pulses at the sampling frequency $f_s$ and the A/D converters 3 samples information signals in respective channels with the sampling pulses and convert them to respective digital signals. If it is assumed that an input signal (information signal) in a k-th channel to be transmitted is represented by $x_k(t)$ (k=0, 1, 2, . . . , N−1), then a signal $x_k(Z)$ sampled, converted, and outputted by an A/D converter 3 is expressed by:

$$x_k(Z) = \sum_m x_k(m) Z^{-m} \qquad (1)$$

where $x_k(m)$ is an m-th sampled value of the inputted signal $x_k(t)$, Z is expressed by:

$$z = \exp(j\omega/f_s) \qquad (2)$$

where $$\omega = 2\pi f \qquad (3)$$

j is an imaginary unit, and f is a frequency variable.

The characteristics of a channel filter for band-limiting the signal in each channel are expressed by:

$$G(Z) = \sum_{l=0}^{L-1} g(l) Z^{-l} \qquad (4)$$

The equation (4) is modified as follows:

$$G(Z) = \sum_{i=0}^{N-1} Z^{-i} G_i(Z^N) \qquad (5)$$

where $$G_i(Z^N) = \sum_{l'=0}^{L/N-1} Z^{-i} g(l'N + i) Z^{-Nl'} \qquad (6)$$

If the signal in each channel is passed through the channel filter G(Z) and shifted to a designated frequency position, and thereafter the signals in all channels are added together, then there is obtained a frequency-division multiplex signal to be transmitted. For example, the signal in the k-th channel is shifted to a frequency position indicated by:

$$\omega k = k \ast 2\pi \ast \Delta f \qquad (7)$$

where $$\Delta f = f_s/N \qquad (8)$$

A result $Y_k(Z)$ obtained when an input signal $X_k(Z)$ in each channel is band-limited by the channel filter G(Z) is expressed by:

$$Y_k(Z) = G(Z) x_k(Z) \qquad (9)$$

$$= \sum_{i=0}^{N-1} Z^{-i} G_i(Z^N) x_k(Z)$$

To frequency-shift the result $Y_k(Z)$ to $\omega_k$, a variable conversion represented by:

$$Z \rightarrow \exp(-j\omega_k/f_s) \ast Z \qquad (10)$$

may be carried out. A result obtained by such a variable conversion is as follows:

$$Y_k(Z; k) = \sum_{i=0}^{N-1} \exp(ji\omega_k/f_s) Z^{-i} G_i(Z^N) x_k(\exp(-j\omega_k/f_s)) \qquad (11)$$

$$= \sum_{i=0}^{N-1} \exp(j2\pi ki/N) Z^{-i} G_i(Z^N) x_k(\exp(-j2\pi k/N) \cdot Z)$$

where $$\frac{\omega_k}{f_s} = 2\pi k \frac{\Delta f}{f_s} = \frac{2\pi}{N} k \qquad (12)$$

is used.

The channels each expressed by the equation (11) for k=0~N−1 are added into an output signal Y(Z) to be transmitted, which is expressed as follows:

$$Y(Z) = \sum_{k=0}^{N-1} Y_k(Z; k) \qquad (13)$$

$$= \sum_{i=0}^{N-1} Z^{-i} G_i(Z^N) \sum_{k=0}^{N-1} \exp(j2\pi ki/N) x_k(\exp(-j2\pi k/N) \cdot Z)$$

where the term $Z^{-i} G_i(Z^N)$ corresponds to a digital filter and the term $\Sigma \exp(j2\pi k_i/N)$ corresponds to an inverse Fourier transform.

Such a signal combining process is carried out by the signal combining circuit 91 shown in FIG. 5. An input signal sequence which has been converted into a digital value by the A/D converters 3 is frequency-converted by the complex local oscillator 4 and the complex multipliers 5. This frequency conversion corresponds to a conversion in the equation (13), expressed by:

$$x_k(Z) \rightarrow x_k(\exp(-j2\pi k/N) \ast Z) \qquad (14)$$

The input signal sequence thus frequency-converted is inverse-complex-Fourier-transformed by the IFFT circuit 9, filtered by the digital subfilters 10-1~10-N, and passed through the delay units 11-1~11-N, whose output signals are added altogether by the adder 12. It can clearly be seen that these processing steps correspond to the right side of the equation (13).

The output signal Y(Z) thus produced which is to be transmitted comprises a complex digital signal, and is converted into an analog signal by the high-speed D/A converter 44. Thereafter, the signal is converted by the QAM circuit 92 to a quadrature-amplitude-modulated signal, which is transmitted from the transmitter 93 to the reception device 82.

A signal processing procedure in the reception device 82 will be described below.

The signal received by the receiver 94 is supplied as a received IF signal to the QAD circuit 95, which demodulates the signal. The demodulated signal is converted by the A/D converter 48 to a complex digital signal that is applied to the signal branching circuit 96.

It is assumed that the complex digital signal applied to the signal branching circuit 96 is expressed by:

$$R(Z) = \sum_n r(n) Z^{-n} \qquad (15)$$

A frequency branching process is to frequency-shift a signal in a channel k (k=0, 1, 2, ..., N−1) as expressed by $\omega_k \to 0$, and then select a low-frequency component with a given low-pass filter. The frequency conversion (frequency shift) is expressed by:

$$Z \to Z^* \exp(j2\pi k/N) \qquad (16)$$

A result R(z;−k) of the frequency conversion is expressed as follows:

$$R(Z; -k) = \sum_n \exp(-j2\pi k n/N) r(n) Z^{-n} \qquad (17)$$

When this result is extracted using a low-pass filter H(Z), a selected output signal of the k-th channel is obtained. The low-pass filter H(Z) is expressed by:

$$\begin{aligned} H(Z) &= \sum_{l=0}^{L-1} h(l_i) Z^{-l} \\ &= \sum_{i=0}^{N-1} Z^{-i} H_i(Z^N) \\ &= Z^{-(N-1)} \sum_{i=0}^{N-1} Z^i H_{N-1-i}(Z^N) \end{aligned} \qquad (18)$$

An output signal to be determined is expressed by:

$$H(Z) \cdot R(Z; -k) = Z^{-(N-1)} \qquad (19)$$
$$\sum_m Z^{-m} \cdot \exp(-j2\pi k m/N) \cdot \sum_{i=0}^{N-1} \exp(-j2\pi k i/N) H_{N-1-i}(Z^N)_{r(m+i)}$$

where the term exp(−j2 πkm/N) corresponds to a frequency shift, the term (exp(−j2 πki/N) corresponds to a Fourier transform, the term $H_{N-1-i}(Z^N)$ corresponds to a digital filter, and the term r(m+i) corresponds to a shift register.

Such a frequency branching process is carried out by the signal branching circuit 96. The complex digital signal that is applied from the A/D converter 48 to the signal branching circuit 96 is divided by the shift register 27 and the sampling circuits 26-1~26-N into N complex digital signals which are filtered by the digital subfilters 25-1~25-N. The filtered signals are then applied to the FFT circuit 24, which effects a fast complex Fourier transform thereon. The circuits ranging from the shift register 27 to the output terminals of the FFT circuit 24 serve as a filter bank.

A k-th output signal from the FFT circuit 24 has a central frequency of $\omega_k$ and exhibits bandpass filter characteristics expressed by the fundamental filter H(Z). When output signals of adjacent channels from the FFT circuit 24 are added together by the switch circuit 22, it is possible to provide filter banks of various frequency characteristics. Similarly, it is possible for the switch circuit 6 in the transmission device 81 to distribute signals in frequency bands wider than the channel interval Δf to a plurality of adjacent channels through the operation of the switch elements 7. Consequently, the variable-bandwidth frequency-division multiplex communication system according to the present invention can transmit signals in frequency bands wider than the channel interval Δf.

FIGS. 9A, 9B, 9C, and 9D schematically illustrate how the switch elements 7, 17 in the switch circuits 6, 22 operate. As described above, each of the switch elements 7 comprises a 3-input/1-output switch element, whereas each of the switch elements 17 comprises a 1-input/3-output switch element.

Figure 9A:
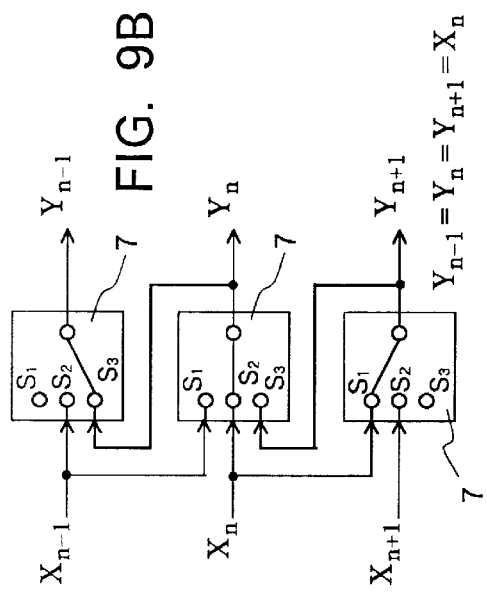
FIGS. 9A and 9B are diagrams illustrative of how switch elements in the signal combining circuit operate.

In the switch circuit 6 in the transmission device 81, as shown in FIG. 9A, when the switch elements 7 select input signals applied to the respective input terminals S2, they supply the applied input signals as they are to the IFFT circuit 9. As shown in FIG. 9B, when the three adjacent switch elements 7 select one input signal, the input signal is applied simultaneously to three input terminals of the IFFT circuit 9. As a result, this input signal is handled as having a bandwidth corresponding to three channels, and the bandwidth is divided into three bandwidths which are outputted from respective three digital subfilters to the adder 12.

Figure 9C:
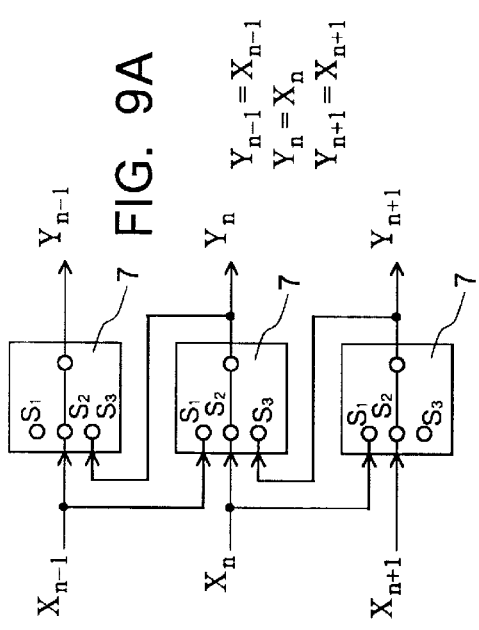
FIGS. 9C and 9D are diagrams illustrative of how switch elements in the signal branching circuit operate.
Figure 9B:
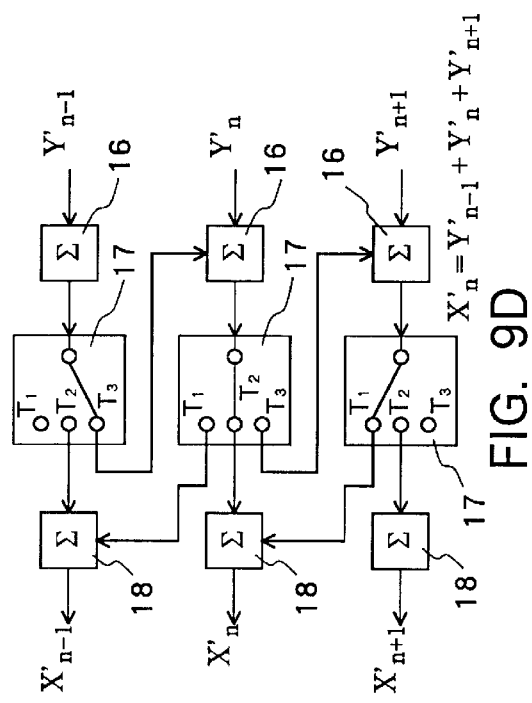
Figure 9D:
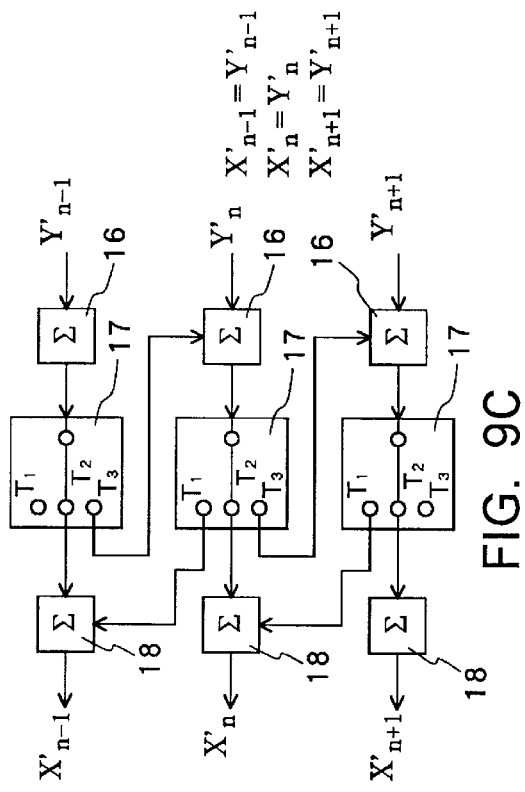

In the switch circuit 22 in the reception device 82, as shown in FIG. 9C, when the switch elements 17 select signals supplied to the respective output terminals S2, they supply the input signals as they are from the FFT circuit 24. When the three adjacent switch elements 17 are controlled as shown in FIG. 9D, one of them adds the signals in the three adjacent channels and outputs a sum signal to a corresponding output terminal of the switch circuit 22. When the switch arrangements shown in FIGS. 9B and 9D are combined with each other, they can transmit a signal with a bandwidth corresponding to three channels.

Figure 10A:
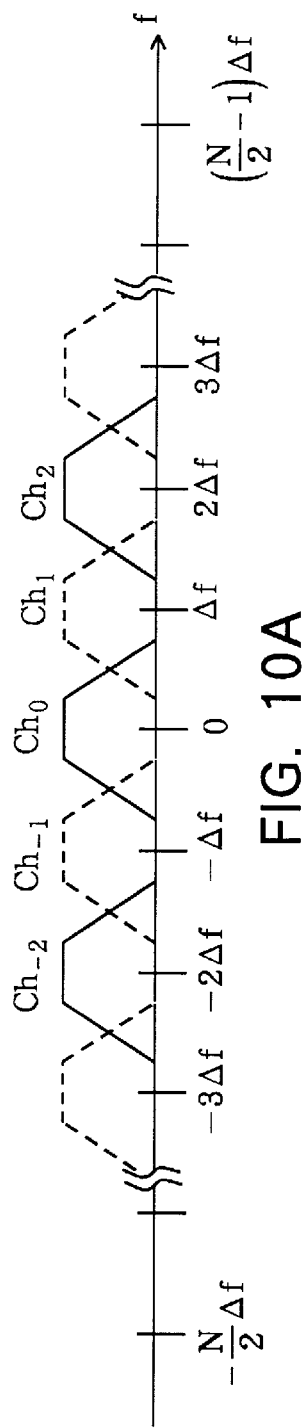
FIGS. 10A, 10B, and 10C are diagrams showing frequency characteristics of filters in the variable-bandwidth frequency-division multiplex communication system shown in FIG. 4.
Figure 10B:
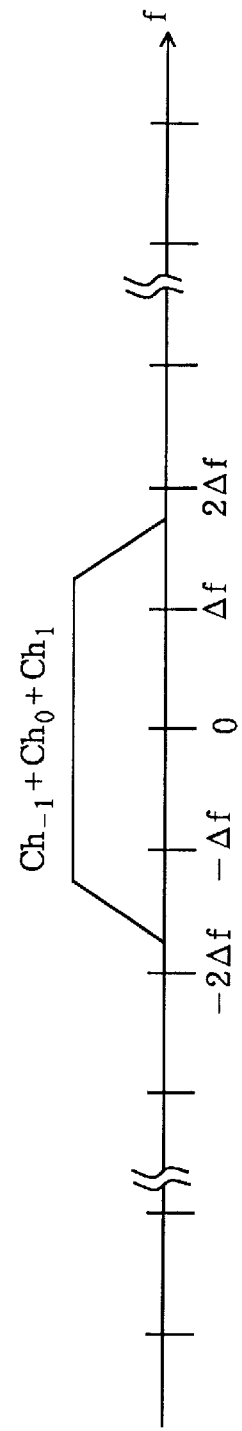
Figure 10C:
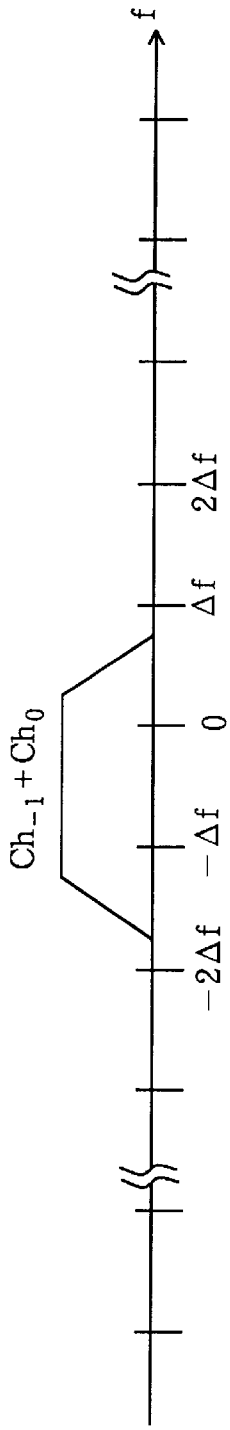

FIGS. 10A, 10B, and 10C show the principles by which a frequency band spreads beyond the frequency interval Δf according to the present embodiment. The fundamental filter H(Z) for each channel has such characteristics that when filters whose central frequencies deviate by Δf are combined, the total frequency characteristic curve is flat as shown in FIG. 10A. Specifically, the digital subfilters 10-1~10-N in the signal combining circuit 91 or the digital subfilters 25-1~25-N in the signal branching circuit 96 serve as one digital filter as a whole, and their frequency characteristic curve becomes completely flat in frequency regions [0, Δf] when folded and superposed at a frequency of Δf/2. Filters of such frequency characteristics are filters of Nyquist frequency characteristics having a Nyquist frequency of Δf/2, and are widely used in communication networks. With fundamental filters of such frequency characteristics being established, when adjacent m channels are combined together, it is possible to construct a variable filter bank whose bandwidth is m times the bandwidth of each filter and whose transmission characteristic curve is flat. For example, when three successive channels ($Ch_1$, $Ch_0$, $Ch_{-1}$) shown in FIG. 10B are combined together, a bandwidth for three channels can be obtained, and when two successive channels ($Ch_0$, $Ch_{-1}$) shown in FIG. 10C are combined together, a bandwidth for two channels can be obtained.

A satellite-switched frequency-division multiple access system, which is a typical example that incorporates the variable-bandwidth frequency-division multiplex communication system shown in FIG. 4, will be described below with reference to FIG. 11.

Figure 11:
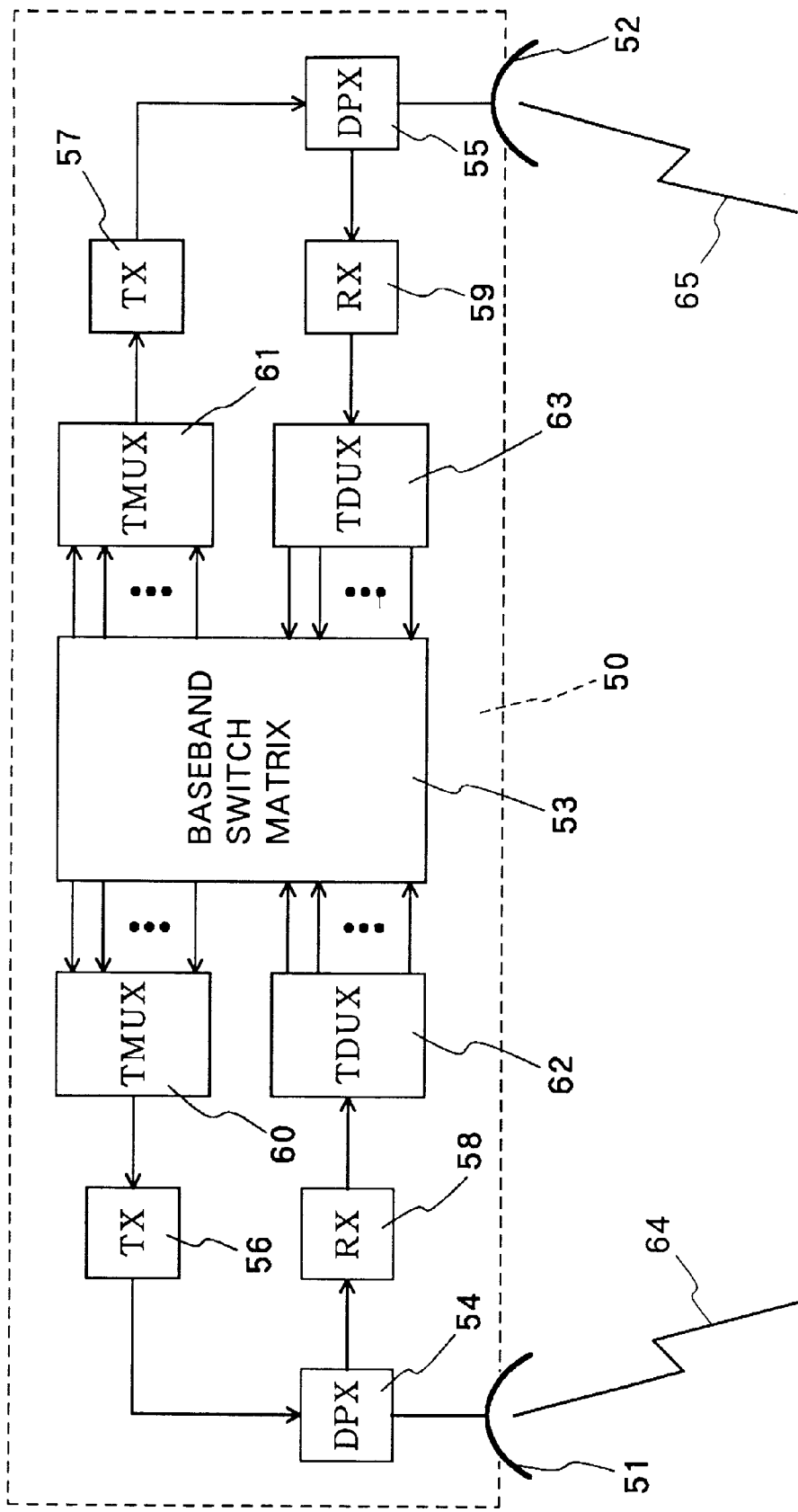
FIG. 11 is a block diagram of a satellite-switched frequency-division multiple access system which incorporates the variable-bandwidth frequency-division multiplex communication system shown in FIG. 4.

As shown in FIG. 11, the satellite-switched frequency-division multiple access system includes a relay station 50 on a communication satellite which has an antenna 51 corresponding to a first beam 64 and an antenna 52 corresponding to a second beam 65. An arrangement for achieving a complete connection between channels using a baseband switch matrix 53 between the two beams 64, 65 will be described below.

The first and second beams 64, 65 correspond to different geographic regions in a service area covered by the communication satellite. The antennas 51, 52 are connected respectively to signal branching units (DPX) 54, 55 for sharing transmission and reception waves. The signal branching circuit 54 is connected to a transmission device (TX) 56 and a reception device (RX) 58, and the signal branching circuit 55 is connected to a transmission device (TX) 57 and a reception device (RX) 59. Signal combining circuits (TMUX) 60, 61, each identical to the signal combining circuit shown in FIG. 5, are connected between the transmission devices 56, 57 and the baseband switch matrix 53. Similarly, signal branching circuits (TDUX) 62, 63, each identical to the signal branching circuit shown in FIG. 6, are connected between the reception devices 58, 59 and the baseband switch matrix 53. Since the signal combining circuits 60, 61 and the signal branching circuits 62, 63 are disposed in the same relay station 50, the sampling timing generator and the complex local oscillator may be shared by the signal combining circuits 60, 61 and the signal branching circuits 62, 63. Because the baseband switch matrix 53 usually comprises a digital signal processor, D/A converters on the input side of the signal combining circuits 60, 61 and A/D converters on the output side of the signal branching circuits 62, 63 are unnecessary. The relay station 50 of the above arrangement can achieve a multiple access capable of a complete connection in a variable bandwidth between channels between the first and second beams 64, 65 through the baseband switch matrix 53.

While a preferred embodiment of the present invention has been described using specific terms, such description is for illustrative purposes only, and it is to be understood that changes and variations may be made without departing from the spirit or scope of the following claims.

What is claimed is:

1. A variable-bandwidth frequency-division multiplex communication system having a transmission device including a signal combining circuit and a reception device including a signal branching circuit, for establishing channels having a frequency band wider than a channel frequency interval $\Delta f$, said signal combining circuit comprising:

a sampling timing generator for generating a sampling frequency $f_s$ which is a multiple by a natural number of said channel frequency interval $\Delta f$;

a plurality of A/D converters associated respectively with N independent information signals to be transmitted, N being a natural number, for sampling the corresponding information signals at said sampling frequency $f_s$ and converting the information signals to digital signals;

a complex local oscillator for generating complex signals each having a frequency which is k times said channel frequency interval $\Delta f$, k being an integer ranging from 0 to N−1;

N complex multipliers for multiplying the digital signals from said A/D converters by the respective complex signals from said complex local oscillator, and producing N output signals;

an inverse Fourier transform circuit for effecting a complex inverse Fourier transform of N points;

an N-input/N-output switch circuit connected between output terminals of said complex multipliers and input terminals of said inverse Fourier transform circuit;

a plurality of digital subfilters connected respectively to N output terminals of said inverse Fourier transform circuit, for filtering output signals from said inverse Fourier transform circuit;

a plurality of delay units connected respectively to output terminals of said digital subfilters; and an adder for adding output signals from said delay units and outputting a sum signal;

wherein a k-th delay unit ($1 \leq k \leq N$) applies a time lag expressed by $(k-1)/f_s$ to an output signal from a corresponding one of said digital subfilters.

2. The variable-bandwidth frequency-division multiplex communication system according to claim 1, wherein said sampling frequency $f_s$ is represented by $N\Delta f$, and said transmission device further comprises a high-speed D/A converter for converting a complex sample sequence outputted from said signal combining circuit to a complex continuous signal, and a quadrature amplitude modulation circuit for quadrature-amplitude-modulating a carrier with an output signal from said high-speed D/A converter.

3. The variable-bandwidth frequency-division multiplex communication system according to claim 1, wherein said switch circuit comprises N 3-input/1-output switch elements each represented as a k-th switch element, and wherein said k-th switch element has:

a first input terminal connected to a (k−1)th input terminal of said switch circuit;

a second input terminal connected to a k-th input terminal of said switch circuit;

a third input terminal connected to a (k+1)th input terminal of said switch circuit; and an output terminal connected to a k-th output terminal of said switch circuit.

4. The variable-bandwidth frequency-division multiplex communication system according to claim 1, wherein said complex local oscillator comprises an N-output direct digital synthesizer.

5. The variable-bandwidth frequency-division multiplex communication system according to claim 1, wherein said digital subfilters serve as a single digital filter as a whole, and have a frequency characteristic curve which becomes completely flat in frequency regions [0, $\Delta f$] when folded and superposed at a frequency of $\Delta f/2$.

6. The variable-bandwidth frequency-division multiplex communication system according to claim 2, wherein said switch circuit comprises N 3-input/1-output switch elements each represented as a k-th switch element, and wherein said k-th switch element has:

a first input terminal connected to a (k−1)th input terminal of said switch circuit;

a second input terminal connected to a k-th input terminal of said switch circuit;

a third input terminal connected to a (k+1)th input terminal of said switch circuit; and an output terminal connected to a k-th output terminal of said switch circuit.

7. A variable-bandwidth frequency-division multiplex communication system having a transmission device including a signal combining circuit and a reception device including a signal branching circuit, for establishing channels having a frequency band wider than a channel frequency interval $\Delta f$, said signal branching circuit comprising:
  a sampling timing generator for generating a sampling frequency $f_s$ which is a multiple by a natural number of said channel frequency interval $\Delta f$;
  an N-output shift register for shifting a complex digital numerical sequence of a received digital signal in synchronism with said sampling frequency $f_s$, N being a natural number;
  a sampling circuit for sampling output signals from respective stages of said shift register in synchronism with said sampling frequency $f_s$;
  a plurality of digital subfilters for filtering respective N signals outputted parallel from said sampling circuit;
  a Fourier transform circuit for effecting a complex Fourier transform of N points on respective output signals from said digital subfilters;
  an N-input/N-output switch circuit connected to output terminals of said Fourier transform circuit;
  a complex local oscillator for generating complex signals each having a frequency which is k times said channel frequency interval $\Delta f$, k being an integer ranging from 0 to N−1;
  N complex multipliers for multiplying output signals from said switch circuit by the respective complex signals from said complex local oscillator, and producing N output signals; and
  a plurality of D/A converters connected respectively to output terminals of said complex multipliers.

8. The variable-bandwidth frequency-division multiplex communication system according to claim 7, wherein said sampling frequency $f_s$ is represented by $N\Delta f$, and said reception device further comprises a quadrature amplitude demodulation circuit for quadrature-amplitude-demodulating a received intermediate-frequency signal, and an A/D converter for sampling an output signal from said quadrature amplitude demodulation circuit at said sampling frequency $f_s$ and converting the sampled signal to a complex digital signal, which is applied to said shift register.

9. The variable-bandwidth frequency-division multiplex communication system according to claim 7, wherein a received signal which is converted to a baseband signal and converted to a digital signal is applied to said signal branching circuit, and said D/A converters produce frequency-divided multiplex output signals.

10. A variable-bandwidth frequency-division multiplex communication system according to claim 7, wherein said switch circuit comprises N 1-input/3-output switch elements, N first adders each represented by a k-th first adder, and N second adders each represented by a k-th second adder, and wherein:
  said k-th second adder adds an output signal from a first output terminal of a (k+1)th switch element and an output signal from a second output terminal of a k-th switch element, and outputs a sum signal to a k-th output terminal of said switch circuit; and
  said k-th first adder adds an output signal from a third output terminal of a (k−1)th switch element and a signal from a k-th input terminal of said switch circuit, and inputs a sum signal to an input terminal of said k-th switch element.

11. The variable-bandwidth frequency-division multiplex communication system according to claim 7, wherein said complex local oscillator comprises an N-output direct digital synthesizer.

12. The variable-bandwidth frequency-division multiplex communication system according to claim 7, wherein said digital subfilters serve as a single digital filter as a whole, and have a frequency characteristic curve which becomes completely flat in frequency regions [0, $\Delta f$] when folded and superposed at a frequency of $\Delta f/2$.

13. The variable-bandwidth frequency-division multiplex communication system according to claim 8, wherein said switch circuit comprises N 1-input/3-output switch elements, N first adders each represented by a k-th first adder, and N second adders each represented by a k-th second adder, and wherein:
  said k-th second adder adds an output signal from a first output terminal of a (k+1)th switch element and an output signal from a second output terminal of a k-th switch element, and outputs a sum signal to a k-th output terminal of said switch circuit; and
  said k-th first adder adds an output signal from a third output terminal of a (k−1)th switch element and a signal from a k-th input terminal of said switch circuit, and inputs a sum signal to an input terminal of said k-th switch element.

14. A variable-bandwidth frequency-division multiplex communication system for achieving a multiplex access using a relay station having antennas corresponding to respective geographic regions, to provide a complete connection between said regions, said relay station having:
  as many sets of a reception device and a transmission device as the number of said antennas, a sampling timing generator for generating a sampling frequency $f_s$ which is a multiple by a natural number of said channel frequency interval $\Delta f$, a complex local oscillator for generating complex signals each having a frequency which is k times said channel frequency interval $\Delta f$, k being an integer ranging from 0 to N−1 and N being a natural number, a baseband switch matrix, signal branching circuits connected between the reception devices and said baseband switch matrix, and signal combining circuits connected between the transmission devices and said baseband switch matrix;
  each of said signal combining circuits comprising;
    a first complex multiplying circuit having complex multipliers associated respectively with N independent information signals outputted from said baseband switch matrix, for multiplying the information signals by the respective complex signals from said complex local oscillator and producing N output signals;
    an inverse Fourier transform circuit for effecting a complex inverse Fourier transform of N points;
    an N-input/N-output first switch circuit connected between output terminals of said first complex multiplying circuit and input terminals of said inverse Fourier transform circuit;
    a plurality of first digital subfilters connected respectively to N output terminals of said inverse Fourier transform circuit, for filtering output signals from said inverse Fourier transform circuit;
    a plurality of delay units connected respectively to output terminals of said digital subfilters; and
    an adder for adding output signals from said delay units and outputting a sum signal to said transmission device;

wherein a k-th delay unit ($1 \leq k \leq N$) applies a time lag expressed by $(k-1)/f_s$ to an output signal from a corresponding one of said first digital subfilters;

each of said signal branching circuits comprising:
- an N-output shift register for shifting a complex digital numerical sequence from said reception device in synchronism with said sampling frequency $f_s$;
- a sampling circuit for sampling output signals from respective stages of said shift register in synchronism with said sampling frequency $f_s$;
- a plurality of second digital subfilters for filtering respective N signals outputted parallel from said sampling circuit;
- a Fourier transform circuit for effecting a complex Fourier transform of N points on respective output signals from said second digital subfilters;
- an N-input/N-output second switch circuit connected to output terminals of said Fourier transform circuit; and
- a second complex multiplying circuit having N complex multipliers for multiplying output signals from said second switch circuit by the respective complex signals, producing N output signals, and supplying the N output signals as frequency-divided multiplex signals to said baseband switch matrix.

* * * * *